V. W. PAGÉ.
VEHICLE BODY AND SEAT.
APPLICATION FILED MAR. 10, 1921.

1,411,978.

Patented Apr. 4, 1922.

Witnesses

Inventor
VICTOR PAGÉ
By Attorney

UNITED STATES PATENT OFFICE.

VICTOR W. PAGÉ, OF NEW YORK, N. Y.

VEHICLE BODY AND SEAT.

1,411,978. Specification of Letters Patent. Patented Apr. 4, 1922.

Application filed March 10, 1921. Serial No. 451,110.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Vehicle Body and Seat, of which the following is a full, clear, and exact description.

The present invention relates to new and useful improvements in bodies for motor vehicles and it pertains more particularly to a seat construction therefor.

It is one of the objects of the invention to so construct a vehicle seat that the same may be moved from operative position to inoperative position as a single unit.

It is a further object of the invention to so construct the rear seat of a motor vehicle that the same may be swung to its inoperative position, to provide an unobstructed space or compartment between the front and rear seats for the storage of packages and other articles.

It is a further object of the invention to construct a vehicle seat in such a manner that the entire seat and its mountings are a self-contained single unit and may be operated as such to move it from its operative position to its inoperative position and vice versa.

With the above and other objects in view, reference is had to the accompanying drawings, in which—

Figure 1:
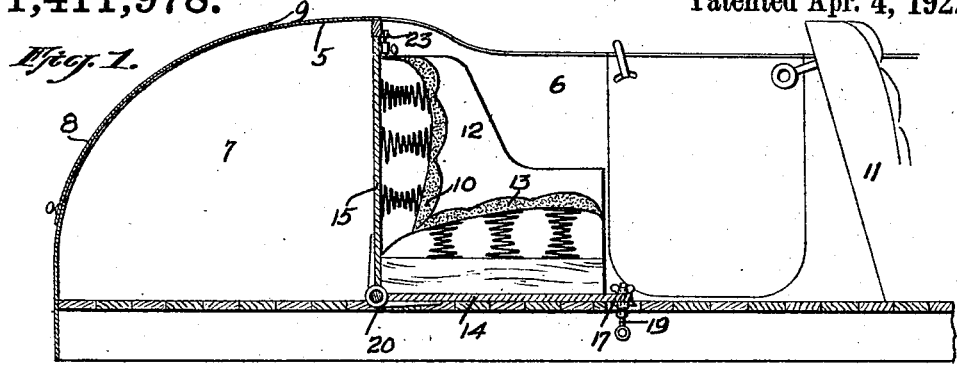
Figure 1 is a longitudinal sectional view of a vehicle body showing the rear seat in its operative position.

Referring more particularly to the drawings, the reference character 5 designates the vehicle body and said body is formed at the rear of the tonneau 6 with a compartment 7, access to which is had through the medium of a door 8, hinged or otherwise secured to the body 5 as at 9.

Figure 2:
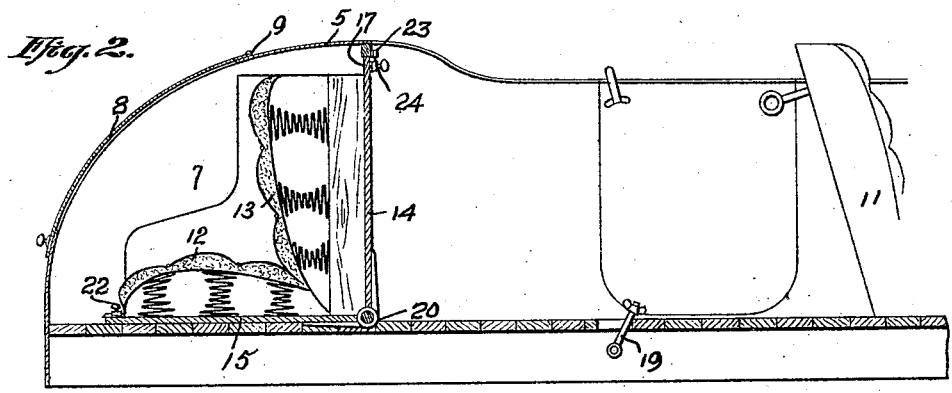
Fig. 2 is a similar view showing the rear seat in its inoperative position.
Figure 3:
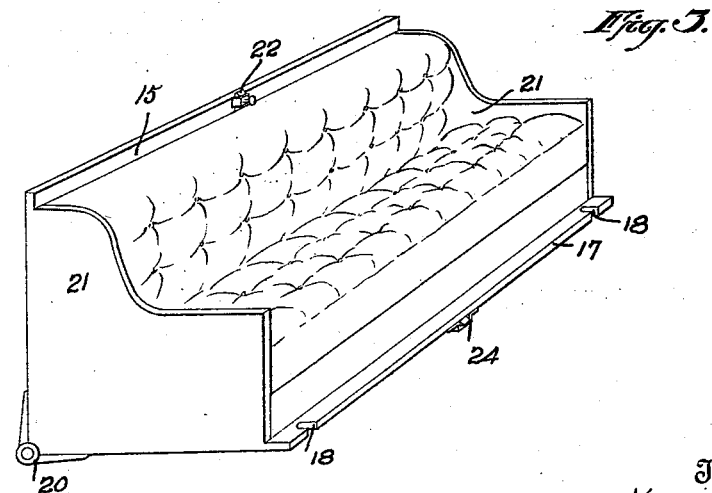
Fig. 3 is a perspective view of the seat unit.

The reference character 10 designates the rear seat, and 11 designates the front seat, which latter is preferably built in the car in such a manner as to be stationary therein. The rear seat 10 is so constructed as to provide a back portion 12 and a seat portion 13, each of which is upholstered in the ordinary manner. The upholstery of the rear seat, however, is built up on the right-angular body portion, of which the member 14 is the bottom or base and the member 15 is the rear. The seat is provided with end sections 21, which form the ends of the seat unit. As more clearly shown in Figs. 1 and 3, the base portion 14 projects beyond the front of the seat as at 17, and said projecting portion is notched as at 18 for the reception of pivoted bolts 19, by means of which the seat is maintained in its operative position. This entire seat structure is pivotally mounted in the body by means of hinges or the like 20, in such a manner that the same when rocked about its hinges 20 to the inoperative position, will occupy a position within the compartment 7, as more clearly shown in Fig. 2. The back portion 15 of the seat is provided with a latch 22, and said latch is adapted to engage a catch 23 carried by the body when the seat is in its operative position as shown in Fig. 1. The projecting portion 17 of the base is likewise provided with a latch 24 adapted to engage the catch 23 to retain the seat in its inoperative position as shown in Fig. 2.

The device operates in the following manner:

When it is desired to use the seat, the same is positioned as shown in Fig. 1 with the bolts 19 in engagement with the notches 18, and the latch 22 in engagement with the catch 23, which serves to maintain the seat in its operative position. When, however, it is desired to use the space between the front and rear seats for the purpose of carrying packages or other articles, and it is desired to enlarge this space, the bolts 19 are disengaged from the notches 18 and the latch 22 disengaged from the catch 23, after which the seat is rocked about its pivotal point until it occupies the position shown in Fig. 2, in which position the bottom 14 forms the rear wall of the tonneau compartment and the entire seat is positioned within the compartment 7 leaving a free and unobstructed compartment between the front and rear seats of greater size than is ordinarily available.

From the foregoing it will be apparent that the present invention provides a new and improved seat construction for vehicle bodies in which the seat may be moved to a position where it is entirely inoperative for the purpose of giving a free and unobstructed space or compartment to the rear of the front seat of the vehicle for the reception of various articles, such as packages and the like.

I claim—

In combination with a vehicle body having a floor and sides, a seat comprising a seat portion and a back portion right-angularly disposed with respect to each other, means for pivotally connecting the seat to the floor of the body, said means being located at the junction of the seat and back portion, means carried by the body and adapted for engagement with the seat to secure the seat portion of the seat in engagement with the floor to maintain the seat in operative position, and means carried by the seat portion of the seat and adapted for engagement with means carried by the body for retaining the seat in inoperative position.

VICTOR W. PAGÉ.